Patented Mar. 1, 1938

2,110,085

UNITED STATES PATENT OFFICE 2,110,085

RESINOUS COATING COMPOSITIONS

Horace H. Hopkins, Springfield, Pa., assignor to E. I. du Pont de Nemours & Company, Wilmington, Del., a corporation of Delaware No Drawing. Application December 18, 1935, Serial No. 55,114

4 Claims. (Cl. 134—26)

This invention relates to new and useful coating compositions and more particularly to coating compositions comprising China-wood oil modified polyhydric alcohol-polybasic carboxylic acid resins as a film forming constituent and a process for making the same.

China-wood oil is used extensively either as the sole or as a constituent ingredient of the vehicle in various types of coating compositions. This oil possesses many properties as a film forming material which makes its use highly desirable. When used in compositions which are dried or hardened by heating at elevated temperatures, the film produced has a tendency to become dull, which is due to the formation of very fine wrinkles. This phenomenon is generally known as "frosting". In many instances the wrinkles are quite prominent, in which case the phenomenon is known as "wrinkling" or "crowsfooting". The production of such films is of course unsatisfactory from an appearance standpoint. Ways and means have been suggested for overcoming this defect in the oil and such are known usually as "curing" the oil. However, these "curing" treatments are not entirely satisfactory or reliable so far as eliminating the tendency of the China-wood oil to "frosting", "wrinkling" or "crowsfooting" when this oil is present as an ingredient in the coating composition. This tendency of China-wood oil to "frosting", etc. is evident even when the oil is present in compositions as a modifier of the other film forming ingredient; for example as a modifier for polyhydric alcohol-polybasic acid resins. Polyhydric alcohol-polybasic acid resins modified with China-wood oil or with a mixture of China-wood and linseed oils have important and desirable commercial applications in the production of industrial finishes but possess, to the extent of being troublesome, this tendency to produce films which show "frosting", "wrinkling", or "crowsfooting". Compositions which contain these materials but which will be substantially free from the defect noted are therefore highly desirable from a commercial standpoint.

It has previously been proposed to mix a polyhydric alcohol-polybasic acid resin with phenol-aldehyde resin in order to obtain a composition exhibiting the properties of both resins. Insofar as I am aware, however, the elimination of frosting in China-wood oil modified polyhydric alcohol-polybasic acid resin coating compositions by the use of small amounts of certain phenol-aldehyde resins, as well as the method disclosed herein for successfully accomplishing this object, has not been suggested by prior investigators.

The frosting oils with which the present invention is concerned are designated herein generally as China-wood oil and include in addition to the wood oils the other oils such as oiticica oil which produce films subject to frosting upon drying.

This invention has as an object the provision of resinous coating compositions containing China-wood oil in free or combined form which may be baked at elevated temperatures and produce films substantially free from "frost", "wrinkles" or "crowsfoot". Another object is the provision of resinous coating compositions in which the principal film forming ingredient is a normally "frosting" oil modified polyhydric alcohol-polybasic acid resin, which may be baked at elevated temperatures and produce films substantially free from "frost", "wrinkles" and "crowsfooting". A still further object is the provision of new and useful coating compositions. Other objects will appear hereinafter.

These objects are accomplished by the use of an oil-soluble phenol-formaldehyde resin, in relatively small quantities, with the frosting oil modified polyhydric alcohol-polybasic acid resin, the phenol-formaldehyde resin being introduced into the polyhydric alcohol-polybasic acid resin composition by means of a phenol-formaldehyde China-wood oil varnish composition.

In carrying out my invention a small amount of a specially prepared varnish made from China-wood oil and one of the several known oil-soluble phenol-aldehyde resins is added to an enamel formulated with the China-wood oil modified polyhydric alcohol-polybasic acid resin and the usual thinner, dryer, pigment, etc.

The oil-soluble phenol-aldehyde resins may be prepared, as is now known, by using special phenols, a satisfactory resin for the present purpose is one made from para-hydroxy diphenyl and formaldehyde. The resin, as indicated above, is used in my invention in the form of a China-wood oil varnish having about the following composition:

| | Per cent by weight |
|---|---|
| Phenol-aldehyde resin | 40 |
| Raw China-wood oil | 19 |
| Xylol | 41 | and is prepared under carefully controlled conditions according to the following procedure: The phenol-aldehyde resin and the raw China-wood oil are placed in a suitable varnish kettle and heated to 300° F. A temperature of between 300 and 350° F. is maintained until all of the resin is dissolved in the oil. The temperature is then increased in approximately 15 minutes' time to 485° F., after which the source of heat is removed. The temperature of the mixture then rises to 500° F. and the mixture is maintained at this temperature for approximately 5 minutes. The contents of the kettle are then immediately cooled to 425° F. by spraying water on the bottom of the kettle and then the toluol added. Some toluol is lost by evaporation so that when the varnish has reached room temperature, or thereabout, the toluol content is adjusted to 41%. The procedure just described is particularly adapted to the preparation of a 115 gallon size run.

The varnish prepared according to the above procedure possesses the following properties: Body W±1 Gardner-Holdt scale; weight per gallon 8.44#±.05; tack free drying time 2½ hours; color 5.5±.5 Gardner-Holdt scale.

The invention is best illustrated by the following examples of compositions which are intended to be illustrative only:

Example I

*Air drying black enamel*

|  | Parts by weight |
|---|---|
| Carbon black | 1.70 |
| Prussian blue | .60 |
| Resin | 27.85 |
| Phenol-aldehyde resin varnish | 8.00 |
| Cobalt naphthenate solution | .60 |
| Lead naphthenate solution | .20 |
| Manganese naphthenate solution | .20 |
| Xylol | 39.90 |
| Toluol | 20.95 |

The drier solutions are such as are prepared by dissolving the metallic naphthenates in a hydrocarbon solvent. The solutions are prepared so that they contain as metal, based on the solution lead 16%, manganese 3% and cobalt 1.99%.

The resin used in the above example was a 45% China-wood oil modified glyceryl phthalate resin. These resins are prepared in the known manner by reacting with heat treatment glycerol, phthalic acid and the mixture of acids obtained from the hydrolysis of China-wood oil. When the oil is used instead of the acids derived therefrom the oil is first reacted with the glycerol and the product obtained heated with phthalic anhydride. Any of the polyhydric alcohols and polybasic acids known to be suitable for making resins of the present kind may be used.

Example II

*Baking type blue enamel*

|  | Parts by weight |
|---|---|
| Prussian blue | 7.25 |
| Resin A | 10.82 |
| Resin B | 17.28 |
| Phenol-aldehyde resin varnish | 3.40 |
| Manganese naphthenate solution | .20 |
| Mineral spirits | 16.25 |
| Petroleum solvent | 24.52 |
| Hi-flash naphtha | 3.88 |
| V. M. & P. naphtha | 8.20 |
| Toluol | 8.20 |

Resin A used in this composition was a 52% linseed oil modified glyceryl phthalate. Resin B was a 30% linseed oil–15% China-wood oil modified glyceryl phthalate. The manganese naphthenate solution was that described under Example I. The petroleum solvent is one of high solvency having a boiling range of from 135° C. to 190° C.

Example III

*Baking type red enamel*

|  | Parts by weight |
|---|---|
| Toluidine red | 7.32 |
| Resin | 32.99 |
| Phenol-aldehyde resin varnish | 1.54 |
| Manganese naphthenate solution | 0.26 |
| Mineral spirits | 21.68 |
| Petroleum solvent | 15.12 |
| Hi-flash naphtha | 1.96 |
| Toluol | 9.56 |
| V. M. & P. naphtha | 9.58 |

The resin used in the above example was a 14% China-wood oil–35% soya bean oil modified glyceryl phthalate. The other ingredients are as described in Example II.

The enamel compositions as described in the examples were prepared according to procedures well known in the art of preparing decorative and protective coating compositions.

Various combinations of non-drying, semi-drying or drying oils or oil acids modified polyhydric alcohol-polybasic acid resins may be used with the China-wood oil or linseed oil modified resins, depending upon the particular type of finished enamel it is desired to produce. The pigment and solvent constituents may vary over limits both as to kind and quantity, which limits will be readily apparent to those skilled in the art.

The phenol-aldehyde varnish constituent of the enamel composition may vary in an amount such that the phenol-aldehyde resin content of the enamel is between 2% and 15% based on the weight of the polyhydric alcohol-polybasic acid resin content. The amount of the resin varnish is preferably less than the maximum just indicated and amounts greater than 15% are usually objectionable from the standpoint of producing a discoloration, etc. The preferred amount of the phenol-aldehyde resin in the enamel has been found to be approximately 5% based on the polyhydric alcohol-polybasic acid resin content.

The compositions of the present invention find particular adaptability as decorative and protective coatings on such materials as metal, wood, glass, etc. The enamels, depending on their formulation, particularly with respect to drier components, may be of such a type as to air dry or they may be baked at elevated temperatures, as for example at 225° F. for 1½ hours.

It will be seen from the foregoing description that the present invention presents a simple but effective method for producing enamel compositions which have as their vehicles polyhydric alcohol-polybasic acid resins modified with "frosting" oils such as China-wood oil, or with mixtures of such oils with linseed oil, and which are free from the undesirable property of "frosting", "wrinkling" or "crowsfooting". A further advantage of my invention is the provision of enamel compositions comprising polyhydric alcohol-polybasic acid resins having improved speed of drying to a hard and tough film.

As many apparently widely different embodiments of this invention may be made without departing from the spirit and scope thereof, it is to be understood that I do not limit myself to the specific embodiments thereof except as defined in the appended claims.

I claim:

1. A method for preventing the frosting of films from a coating composition having as its vehicle a polyhydric alcohol-polybasic acid resin modified with a drying oil subject to frosting in the film, which comprises adding to such coating composition a small amount of oil-soluble resin consisting solely of the reaction product of a phenol and formaldehyde resin by means of a varnish comprising a solution of said phenol-aldehyde resin in a drying oil subject to frosting in the film.

2. A method for preventing the frosting of films from a coating composition having as its vehicle a China-wood oil modified polyhydric alcohol-polybasic acid resin, which comprises adding to such coating composition a varnish comprising China-wood oil and oil-soluble resin consisting solely of the reaction product of a phenol and formaldehyde resin, said varnish being added in an amount which incorporates into said coating composition from 2% to 15% of said phenol-aldehyde resin based on the weight of said polyhydric alcohol-polybasic acid resin.

3. The method set forth in claim 2 in which said resin is modified with linseed oil in addition to China-wood oil, and in which said resin is a glyceryl phthalate resin.

4. A coating composition substantially free from wrinkling and frosting in the film which comprises polyhydric alcohol-polybasic acid resin modified with drying oil which is subject to frosting in the film and which is present in amount to normally cause wrinkling and frosting in the resin film, and from 2% to 15%, based upon the weight of said resin, of oil-soluble resin consisting of the reaction product of a phenol and formaldehyde, said coating composition being that obtained by incorporating said polyhydric alcohol-polybasic acid resin with a varnish comprising a solution of said oil-soluble resin in drying oil subject to frosting in the film.

HORACE H. HOPKINS.